March 4, 1969     T. A. STOTEN     3,430,649
CONTROL VALVES

Filed Aug. 29, 1966     Sheet _1_ of 2

INVENTOR
Terence A. Stoten
BY
Baldwin, Wight, Diller & Brown
ATTORNEY

United States Patent Office 3,430,649
Patented Mar. 4, 1969

3,430,649
CONTROL VALVES
Terence A. Stoten, Barton, England, assignor to
George Kent, Limited
Filed Aug. 29, 1966, Ser. No. 575,832
Claims priority, application Great Britain, Oct. 19, 1965,
44,226/65
U.S. Cl. 137—495          14 Claims
Int. Cl. F16k 31/14, 31/36

ABSTRACT OF THE DISCLOSURE

A fluid control valve device includes operating means for holding a valve member in a normal position to allow fluid to flow over a predetermined pressure range, for moving the valve member in a first direction toward a first seating position in response to a relatively small increase in pressure, for moving the valve member in the opposite direction toward a second seating position in response to a decrease in pressure, and for disconnecting the operating means from the valve member in response to a relatively large increase in pressure, i.e., above said predetermined range, thereby causing said valve member to be seated to shut off fluid flow through the valve device.

---

Figure 1:
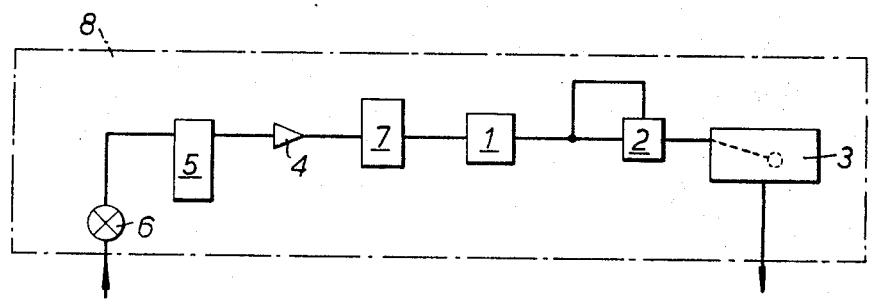

This invention relates to control valves and is particularly although not exclusively applicable to control valves which may be incorporated in domestic fuel-oil systems.

In domestic fuel oil-systems which are supplied from a control distribution point the supply may be from either an elevated reservoir or a pump. Such systems generally give a supply pressure in the range of 1.5 to 50 lb./in. at the household.

In such distribution systems there is a need for a high degree of reliability and safety, and since in general domestic boilers are designed for use with a nominal supply pressure of about 1 lb. per square inch, with a maximum limit of 3.5 lb. per square inch, a pressure reducer is required. To guard against the consequences of this unit failing in service an excess pressure shut-off valve is employed and in some instances a "head breaker" is fitted as a further safety precaution. To guard against flooding the premises with oil in the event of a fractured pipe line, a flow limiting device is fitted in the line and finally a fine filtration unit is situated upstream of all these devices to prevent the ingress of foreign particles which would otherwise result in failure of the control and metering equipment.

It has previously been the practice to cater for each of the above functions by using a separate unit for each. This has necessitated piping the units in the desired order together with a meter for metering the oil consumption and then providing some form of box in which to mount the apparatus, and the present invention is intended to simplify this arrangement.

According to the present invention a fluid control valve device includes operating means to hold a valve member in a position to allow fluid to flow over a predetermined inlet pressure and flow rate range and which acts to move the valve member in a first direction to a first sealing position when the pressure in the valve increases, and which can also act to move the valve member in a second direction opposite to the first to a second sealing position when the pressure decreases.

Such a fluid control valve can be arranged when that it will perform most of the functions set forth above, for example, it will provide accurate control of low pressure output, excessive pressure shutoff, "positive shutoff" against excessive flow rate conditions that is, drop in output pressure due to a pipeline fracture, and positive shutoff in the event of a supply pressure failure.

Preferably the valve member itself allows only a capillary flow when in its operative flow position and the fluid control valve may also include a body portion which carries a filter.

Conveniently a manual override for controlling the position of the valve member is provided to enable the unit to be used on a low pressure supply. This facility also provides means to obtain a high flow rate through the valve for priming the system and also to manually shut off the valve.

Preferably means are provided for disconnecting the valve member from the operating means in the event of a predetermined excessive pressure and this will therefore prevent damage to the mechanism when the valve has seated.

The operating means may include a diaphragm one side of which is exposed to fluid pressure in the valve, and which is connected to the valve member through a pivoted operating lever, which in a preferred form is a bell crank lever.

The diaphragm may be connected to the operating lever through a connection which can "break" in the event of excessive pressure on the diaphragm, to provide the disconnecting means referred to above.

Preferably the valve member is biased towards its second sealing position so that the operating mechanism acts against the biasing.

A setting device is preferably included by means of which the operating range can be varied.

In a preferred embodiment means are also included to indicate the position of the valve member, and in a convenient arrangement where a diaphragm is used the indicating means may include an indicator button actuated by the diaphragm by means of which the precise position of the diaphragm can be identified.

The invention also includes a domestic fuel system incorporating a fluid control device as set forth above.

Figure 2:
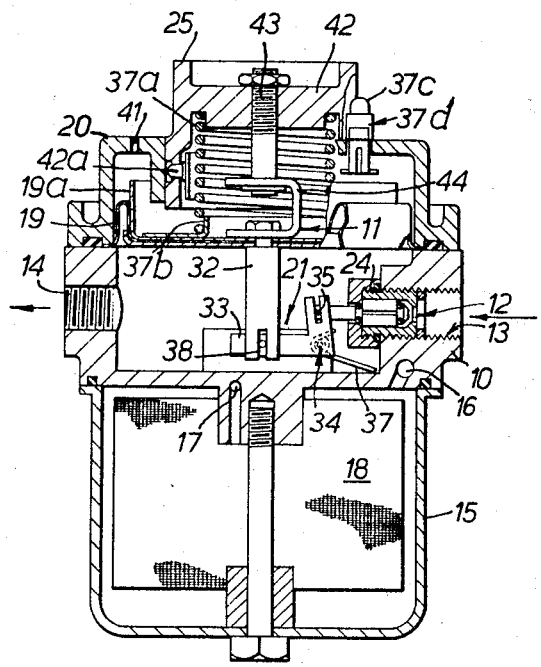
Figure 3:
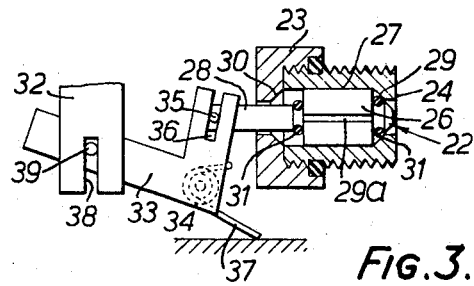
Figure 4:
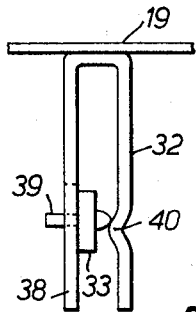
Figure 5:
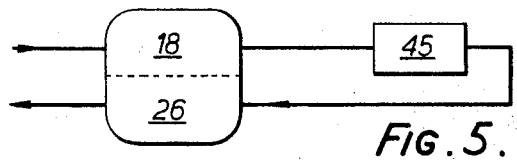
Figure 6:
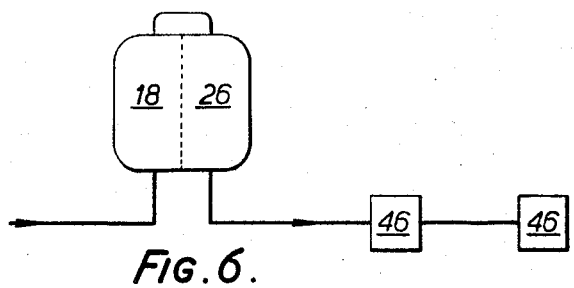

The invention may be performed in various ways but one embodiment will now be described by way of example and with reference to the accompanying drawings in which:

FIGURE 1 is a diagrammatic representation of a known kind of domestic fuel oil system, FIGURE 2 is a cross sectional side elevation of a control valve device according to the present invention, FIGURE 3 is a cross sectional side elevation of the valve member assembly itself, FIGURE 4 is an end elevation of the "breakable" connection between the operating diaphragm and the valve member, and, FIGURES 5 and 6 show alternative ways of connecting the device to other equipment such as a meter.

FIGURE 1 shows a domestic fuel oil system of known kind which may be used for a domestic boiler operating on a nominal supply pressure of about 1 lb. per square inch with a maximum limit of 3.5 lb. per square inch. To guard against the consequence of the pressure reducer 1 of the unit or system failing in service, an excessive pressure cut-off valve 2 is employed and if required a head breaker 3 may be fitted as a further safety precaution. To guard against flooding of the premises with oil in the event of a fractured pipe line a further limiting device 4 is provided in the line and finally a fine filtration unit 5 is situated upstream all these devices. As will be seen it is necessary to pipe the units in the desired order together with a meter 7 for metering the oil consumption and all the devices are usually provided with a box 8 by which they can be mounted. It is intended that the flow control valve device according to the present invention will replace all these units (except the meter), a single diaphragm providing all the required functions.

In the arrangement to be described and a shown in FIGURES 2, 3 and 4 the control valve device is for inclusion in a domestic fuel oil system which operates in a similar manner to that described with regard to the prior art. The device comprises a main body portion 10 the interior of which is hollow and in which is mounted the control mechanism and the valve member indicated generally at 11 and 12, screw threaded inlet and outlet connections 13, 14 being provided. Mounted below this main body is a filter housing 15 which also carries inlet and outlet connections 16, 17 which are isolated from those of the main body and the filter being indicated at 18.

The control mechanism comprises a flexible diaphragm element 19 having a backing piston 19a mounted between the main body 10 and a removable cover 20, a lever assembly 21 which transmits the diaphragm movement and a double acting valve member 22 (see FIGURE 3) carried by a screw threaded member 24 which is mounted in the inlet port 13 and which is controlled by the lever assembly 21. A setting device 25 which is mounted on the cover 20 can be used to manually position the diaphragm assembly 19.

As most clearly shown in FIGURE 3 the double acting movable valve member 22 is carried in a screw threaded member 24 which screws into the inlet port 13, and which is locked in position by a closing element, in the form shown, a nut 23. The valve member 22 comprises a support element 26 which can "float" within a bore 27 in the screw threaded member and the support element itself comprises a piston and an extension or stem 28, the piston having a capillary groove 29a machined along its outside diameter and being a sliding fit within the member 24. Thus, there is a free passage for oil past the piston without having to provide a separate support for the stem 28. The valve seats are in the form of spaced inturned flanges 29, 30 machined both in the member 24 and in the nut 23. Sealing O-rings 31 are provided at each end of the piston to engage with the valve seats when the piston is in either one of its end positions, so that in either of these positions the fluid path through the body 24 is sealed.

A "hairpin" type bracket 32 is mounted on the underside of the diaphragm element 19 as shown in FIGURE 4 and this transmits the diaphragm movements to one end of a bell crank lever 33 which is pivoted to the side of the main body 10 at 34 and the other end of which is pivoted to the valve member extension 28 by means of a pivot pin 35 extending into a slot 36 in the bell crank 33. A return spring 37 acts to bias the piston 26 towards its seating 30 and a coil control spring 37a bears against a skid ring 37b which is mounted on the piston 19a. The other end of the spring 37a is located within the setting device 25 in compression and holds the valve member extension 28 so that when there is no fluid pressure force being applied to the diaphragm 19, the seal 31 on adjacent end of the piston is sealing against its seat 30 in the nut. The hairpin type bracket 32 is provided with a slot 38 which co-operates with a pin 39 on the bell crank lever 33, and an abutment 40 on the other arm of the hairpin bracket 32 engages beneath the pin 39 and ensures that when the diaphragm 19 moves upwardly the end of the bell crank lever moves with it and the motion is thus transferred to the valve member 26. In the event of excessive pressure on the diaphragm 19 it can be effectively disconnected from the bell crank lever 33 by the spring biasing action of the arm carrying the abutment 40 moving over the pin 39 and thus freeing the hairpin bracket 32 from the bell crank lever 33.

Outlet oil pressure acts on the underside of the diaphragm 19, the upper side of which is vented to atmosphere through an opening 41 in the cover 20 and movement of the diaphragm is transmitted via the lever assembly 21 to the valve piston 26, and compresses the return spring 37a which thus provides an opposing force to that set up by the oil pressure on the diaphragm.

In the operating condition the valve piston 26 is moved by the upward movement of the diaphragm 19 until such time as the other O-ring 31 at the other end of the piston starts to seal on its seat 29. Thus, the value to which the outlet pressure can rise is limited by the throttling action of the valve. Any further increase or decrease in this pressure is compensated for by the further closing or opening of the valve so that for a particular value the diaphragm will take up a position which ensures that the pressure drop across the valve is just sufficient to maintain the pressure at that value.

The assembly is primed initially by unscrewing the setting device 25 which comprises a boss 42 which screws into a single thread screwed bore in the cover 20. The boss carries a projecting spring plunger 42a which can co-operate with three notches in the screw thread to locate it in defined positions. A lifting pin 43 carried by the boss engages under a hook 44 on the top of the diaphragm 19 and lifts it sufficiently to unseat the valve piston 26 from the seating 30 and allow oil to flow into the interior of the main body 10. Once this is filled the setting device 25 can be returned to its proper position and FIGURE 2 shows the assembly ready for priming to take place.

The three defined positions of the central boss 42 are "central," which is the normal operating position, "prime" which is a position in which the boss is higher to move the piston 26 off its inner seat 30, and "off" in which the boss is higher again and the diaphragm is lifted sufficiently to hold the valve piston 26 against its outer seat 29. The boss can of course be moved beyond both the "central" and "off" positions on its screw thread if desired and as required.

In the event of a pressure surge in the supply or incorrect seating of the valve seal due to wear or trapped debris excess pressure shutoff is provided for by the hairpin type bracket 32 connected to the diaphragm 19 as described above. As the pressure rises, so forcing the diaphragm 19 continually upwards, the excess pressure will eventually cause the abutment 40 to snap clear of the engagement with the bell crank lever pin 39 and the valve piston 26 then becomes free to seat back on the inner valve seat 30 under the action of the return spring 37 and inlet pressure and so seal off the output from the fuel line. Since the diaphragm 19 is no longer under any restraint, the output pressure immediately falls to the nominal control pressure. Reseating of the valve piston to restore it to the operating condition is achieved by screwing down the setting device 25 so forcing down the diaphragm 19 until the hairpin type bracket 32 again engages the bell crank pivot pin 39. Return of the setting device to the normal position then allows the unit to be primed again for use. Operation of the excess pressure device will normally have been sufficient to clear any obstruction in the valve and allow the unit to function normally.

If the output pressure falls to a low value due to a pin line fracture or similar condition the diaphragm 19 descends until the valve piston 26 is drawn back sufficiently to engage the inner valve surface 30 so shutting off the flow. The line pressure also assists in closing the valve. Similarly, should the supply pressure fall to a value below the outlet control pressure or fail completely, the valve piston 26 will again seal on its inner seat 30 and act as a nonreturn valve to prevent any drain back of the supply lines and thus eliminate the need to reprime the main line. When the supply is restored the valve remains "shut off" until it is primed thereby preventing flooding of an unlit burner.

In the event of the unit being required to operate on a temporarily low supply pressure the setting device 25 can be set to the "priming" position so that the diaphragm is lifted sufficiently to prevent valve piston 26 engaging the inner valve seating 30 under the low supply pressure shut off condition. Outlet pressure control is still ready to be effected, however, should the inlet pressure increase.

The valve can be manually shut off by unscrewing the setting device 25 and so lifting the diaphragm 19 so that the piston 26 engages the outer valve seating 29 and so shuts off the flow.

Projecting through the cover 20 is an indicator button 37c which rests on and moves with the diaphragm piston 19a. A measure of the gap between a collar 37d provided on the button and the face of the cover 20 indicates the position of the diaphragm piston assembly. This button is bifurcated at its lower end and the arms 37d thus provided are sprung outwardly so that the button will "hold" in its uppermost position which will correspond to the excess pressure condition and must therefore subsequently be depressed manually to reset for normal flow conditions.

The filter unit containing the filter element 18 is fitted to the underside of the valve body 10 and is provided with separate connections 16, 17 in order to provide for alternative flow sequence arangements. Thus, the device may be connected as shown in FIGURE 5 so that there is a meter 45 on the high pressure side of the valve device, the fuel first passing through the filter 18, then the meter 45 or other equipment and then through the control valve 26, or the connections may be as shown in FIGURE 6 so that fuel passes through the filter 18 then the control valve 26 before passing to the other equipment indicated at 46. In practice, the valve device together with a meter would be mounted in a box, not shown, suitable for mounting on a wall. As such the valve device itself incorporates means to manually cut off the supply but in addition, an isolating valve may be fitted in the supply main well away from the household in order to comply with local fire safety requirements.

What I claim is:

1. A fluid control valve device including a valve member; and fluid pressure responsive operating means for holding said valve member in a normal position to allow fluid to flow over a predetermined pressure range, said operating means being responsive to a relatively small increase in pressure for moving the valve member in a first direction toward a first sealing position and being responsive to a decrease in pressure for moving the valve member in a second direction opposite to the first direction toward a second sealing position, said operating means comprising an element subjected to and movable in response to the pressure of fluid within said valve, and means responsive to application of a relatively large increase in pressure above said range on said element for disconnecting said element from said valve member.

2. A fluid control valve device as claimed in claim 1 in which the valve member is formed with a capillary passage allowing only a capillary flow when in its normal position.

3. A fluid control valve device as claimed in claim 1 in which the fluid control valve includes a body portion which carries a filter.

4. A fluid control valve device as claimed in claim 1 including a manual override for controlling the position of the valve member.

5. A fluid control valve device as claimed in claim 1 in which said element is a diaphragm one side of which is exposed to pressure passing through the valve, and which is connected to the valve member through a pivoted operating lever.

6. A fluid control valve device as claimed in claim 5 in which the connection between the diaphragm and the pivoted operating lever includes a pivot pin located in a slot by a spring, the spring being yieldable to allow the pin to move along the slot in the event of said relatively large increase in pressure being exerted on said diaphragm.

7. A fluid control valve device as claimed in claim 1 including means biasing the valve member toward its second sealing position.

8. A fluid control valve device as claimed in claim 1 including means for indicating the postion of the valve member.

9. A flud control valve device as claimed in claim 5 including an indicating button actuated by the diaphragm by means of which the precise position of the diaphragm can be identified.

10. A fluid control valve device as claimed in claim 1 including a setting device by means of which said predetermined pressure range can be varied.

11. A fluid control valve device as claimed in claim 1 in which the valve member is in the form of a support element which carries a pair of spaced sealing members, the support element being slidable in a bore having spaced inturned flanges which cooperate with the sealing members to act as valve seats.

12. A fluid control valve device as claimed in claim 11 in which the bore is provided in a screw threaded member on which one inturned flange is formed, the other flange being provided by a closing element into which the screw threaded member is screwed.

13. A fluid control valve device as claimed in claim 11 in which the support element has an extension which projects beyond one end of the bore and to which the operating means is connected.

14. A fluid control valve device as claimed in claim 12 including a valve body and in which the screw threaded member is carried in an inlet bore in the valve body.

References Cited

UNITED STATES PATENTS

| 2,592,259 | 4/1952 | Eddy et al. | 137—495 XR |

FOREIGN PATENTS

| 63,652 | 1/1953 | France. |
| 495,927 | 6/1954 | Italy. |
| 528,937 | 8/1956 | Canada. |
| 966,346 | 8/1964 | Great Britian. |
| 1,116,892 | 12/1954 | France. |
| 1,227,429 | 3/1959 | France. |

M. CARY NELSON, *Primary Examiner.*

ROBERT J. MILLER, *Assistant Examiner.*

U.S. Cl. X.R.

137—505.47